(12) United States Patent
Harres et al.

(10) Patent No.: US 9,798,687 B2
(45) Date of Patent: Oct. 24, 2017

(54) METHOD AND DEVICE FOR LIN MASTER AND IDENTICAL LIN SLAVES DATA COMMUNICATION IN MOTOR VEHICLES

(71) Applicant: MAN Truck & Bus AG, Munich (DE)

(72) Inventors: Ulrich Harres, Nürnberg (DE); Rainer Kalass, Rohr (DE)

(73) Assignee: MAN TRUCK & BUS AG, Munich (DE)

( * ) Notice: Subject to any disclaimer, the term of this patent is extended or adjusted under 35 U.S.C. 154(b) by 282 days.

(21) Appl. No.: 14/555,231

(22) Filed: Nov. 26, 2014

(65) Prior Publication Data

US 2015/0169481 A1 Jun. 18, 2015

(30) Foreign Application Priority Data

Dec. 12, 2013 (DE) ........................ 10 2013 020 550

(51) Int. Cl.
| | |
|---|---|
| *G06F 13/364* | (2006.01) |
| *G06F 13/42* | (2006.01) |
| *H04L 12/40* | (2006.01) |
| *G05B 9/03* | (2006.01) |

(52) U.S. Cl.
CPC ........ *G06F 13/364* (2013.01); *G06F 13/4269* (2013.01); *H04L 12/40182* (2013.01); *G05B 9/03* (2013.01); *H04L 2012/40234* (2013.01)

(58) Field of Classification Search
CPC ... H04L 12/40; H04L 12/40234; G06F 13/14; G06F 13/364; G05B 9/03
USPC .................................................. 710/110, 305
See application file for complete search history.

(56) References Cited

U.S. PATENT DOCUMENTS

| | | | | |
|---|---|---|---|---|
| 7,451,026 | B2 * | 11/2008 | Horbelt | H04L 12/40 370/384 |
| 8,935,450 | B2 * | 1/2015 | Nierop | H04L 12/40045 710/110 |
| 9,160,559 | B2 * | 10/2015 | Barrenscheen | H04L 12/403 |
| 2005/0267659 | A1 * | 12/2005 | Sunaga | B60H 1/00814 701/36 |
| 2006/0100718 | A1 * | 5/2006 | Huffington | G05B 9/03 700/19 |
| 2006/0190648 | A1 * | 8/2006 | Larisch | H04L 63/20 710/110 |
| 2007/0033312 | A1 * | 2/2007 | Flandre | H04L 12/403 710/110 |
| 2011/0125945 | A1 * | 5/2011 | Link | H04L 12/10 710/110 |
| 2013/0261928 | A1 * | 10/2013 | Maejima | B60H 1/00978 701/101 |
| 2014/0297913 | A1 * | 10/2014 | Odenbreit | H04L 12/40202 710/110 |

FOREIGN PATENT DOCUMENTS

| | | | |
|---|---|---|---|
| DE | 10 2006 051 222 B3 | 3/2008 | |
| WO | WO9729563 | * 8/1997 | ............... H04J 3/16 |

* cited by examiner

*Primary Examiner* — Tammara Peyton
(74) *Attorney, Agent, or Firm* — Lucas & Mercanti, LLP

(57) ABSTRACT

A method for data communication in a serial LIN bus system that is used to transmit LIN information between a LIN master and LIN slaves includes transmitting the LIN information between the LIN master and the identical LIN slaves via respective data line that run between each of the identical LIN slaves and the LIN master.

8 Claims, 1 Drawing Sheet

METHOD AND DEVICE FOR LIN MASTER AND IDENTICAL LIN SLAVES DATA COMMUNICATION IN MOTOR VEHICLES

CROSS-REFERENCE TO RELATED APPLICATIONS

This application claims the priority of DE 10 2013 020 550.6, filed Dec. 12, 2013, which is incorporated herein by reference.

BACKGROUND OF THE INVENTION

The invention relates to a method for data communication in a serial local interconnect network (LIN) and to a device for data communication.

Data communication can take place in a local area data network, as is existent in motor vehicles, for example, by a LIN data bus system, "LIN" being the abbreviation for "local interconnect network". In a LIN data bus system, a LIN master may be connected via a LIN data bus to a plurality of LIN slaves. LIN slaves can also be referred to as control components that are associated with a plurality of identical and/or different devices to be controlled. Examples of devices to be controlled that it is possible to control with the LIN data bus system are window lifters, seat heaters or generators.

DE 10 2006 051 222 B3 discloses a method for communication on a LIN data bus. In the case of this known method, communication takes place between the LIN master and a plurality of LIN slaves on the basis of the LIN protocol. The data transmission between the LIN master and the LIN slaves is formed serially via the LIN data bus, wherein the data stream, which is divided into a plurality of data blocks, contains identification data, which can also be referred to as identifiers, for each of the LIN slaves. The individual identifiers are used to ensure that the control data and/or information that are/is transmitted via the LIN data bus can be assigned to the respective associated LIN slave. If a plurality of identical generators, for example, are connected in the LIN data bus system, it is necessary for these LIN slaves to be appropriately individualized so that they are able to recognize the individual identifiers in the data stream of the LIN data bus system.

BRIEF SUMMARY OF THE INVENTION

An object of the present invention is to provide a method that allows the use of two or more identical LIN slaves in a LIN data bus system without the need for individual identifiers to be assigned to said LIN slaves in the data stream of the LIN data bus system.

According to an embodiment of the present invention, LIN information is transmitted between the LIN master and identical LIN slaves via a respective separate data line that runs between each of the identical LIN slaves and the LIN master. The identical LIN slaves therefore receive their communication data not via a common LIN data bus but rather via separate and hence individual data lines. The transmission of the LIN information via separate data lines means that it is not necessary for the identical LIN slaves actuated in this manner to be identified by associated identifiers. The identical LIN slaves therefore also do not require individualized identification devices. Hence, for example, it is possible for a plurality of generators in a vehicle together with the associated LIN slaves to be of totally identical design. This results in a production advantage, since these identical appliances do not require measures for individualization or for an individual identifier. Additional, error-prone interconnection is therefore not necessary. In addition, the system also does not require any wiring or any training processes, which means that the service involvement is correspondingly lower. A further substantial advantage is that the bus load in the entire network is reduced in comparison with communication on just one data line, and hence more frequent or higher-frequency communication with connected slaves can take place.

The LIN master preferably establishes what LIN information needs to be transmitted to which of the identical LIN slaves via the respective associated data line. A control program and/or an algorithm can be used in the LIN master to prescribe what LIN information is associated with which identical LIN slave. The LIN master can then send the transmission of the respective LIN information via the associated separate data line that belongs to the selected LIN slave.

At this juncture, it should be expressly mentioned that communication from the LIN slaves to the LIN master is naturally also possible at any time, that is to say that bidirectional communication can take place or be provided at any time. For example, a LIN slave can transmit a temperature, for example, to cite just one example, to the LIN master.

It is also possible for the separate data lines associated with the identical LIN slaves also to be used to transmit LIN information for non-identical LIN slaves.

The invention is based on the further object of specifying a device for carrying out a method that can be used to effect data communication in a LIN data bus system between a LIN master and at least two identical LIN slaves in as simple a manner as possible.

According to another embodiment of the invention, a device for carrying out the above-described method includes at least two LIN slaves of identical design, wherein each of the identical LIN slaves is connected to a LIN master via a respective separate data line. This allows the data to be transmitted between the LIN master and the identical LIN slaves without the use of an identifier associated with each LIN slave. Additional, error-prone interconnection is therefore not necessary. In addition, the system also does not require any wiring or any training processes, which means that the service involvement is correspondingly lower. Furthermore, the effect achieved thereby is that the bus load in the entire network is reduced in comparison with communication on just one data line, and hence more frequent or higher-frequency communication with connected slaves can take place.

It is particularly advantageous if a plurality of identical generators used in a vehicle are actuated as identical LIN slaves, since no kind of measures for identifying the received control information in the LIN slaves are necessary.

In addition, the invention also relates to a vehicle, in particular a commercial vehicle, having a device according to the invention.

BRIEF DESCRIPTION OF THE DRAWINGS

The invention is explained in more detail below with reference to an exemplary embodiment that is shown in the drawings.

DETAILED DESCRIPTION OF THE PREFERRED EMBODIMENTS

Figure 1:
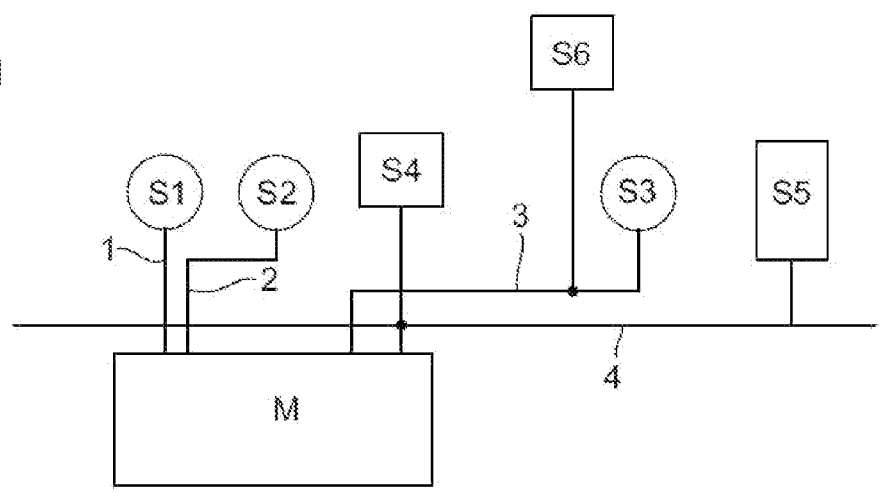
FIG. 1 shows a block diagram of a device according to an embodiment of the invention for data communication in a serial LIN data bus system.

The block diagram shown in FIG. 1 comprises a LIN master M that has a data connection to a plurality of LIN slaves S1 to S6 for the purpose of data communication. A total of three of the LIN slaves are in the form of identical LIN slaves S1 to S3 that are arranged in a vehicle as three identical generators, for example. The other two LIN slaves S4 and S5 are devices of different design that are connected to a general LIN data bus 4. By contrast, the identical LIN slaves S1 to S3 are separately connected to the LIN master M via respective data lines 1; 2; 3.

The separate data lines 1 to 3 may also have non-identical LIN slaves connected to them, as indicated by the LIN slave S6 on the data line 3.

Figure 2:
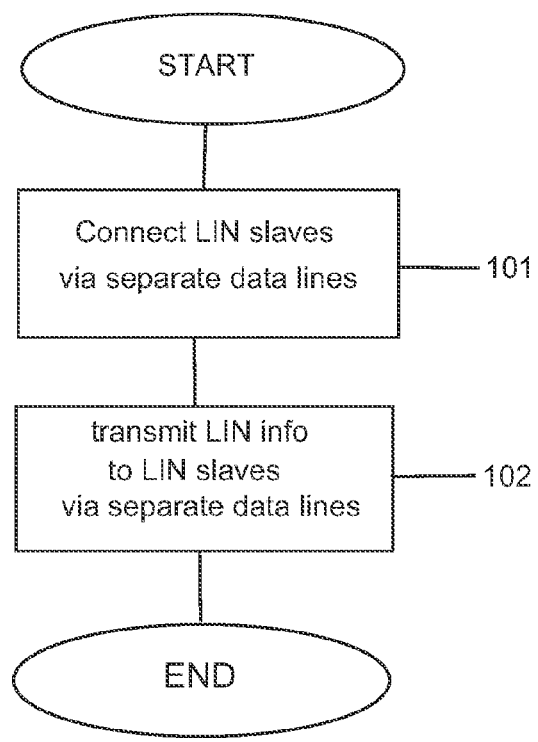
FIG. 2 shows a flow diagram of a method according to an embodiment of the invention.

In a method according to an embodiment of the present invention shown in FIG. 2, identical LIN slaves S1, S2, S3 are each separately connected to the LIN master by respective data lines 1, 2, 3, step 101. LIN information is transmitted to the individual identical LIN slaves S1, S2, S3 by the respective data lines. LIN information may also be transmitted to a non-identical LIN slave S6 connected to one of the respective data lines 1, 2, 3.

The relevant information transmitted from and to the individual LIN slaves is subject to a standardized LIN protocol. By contrast, the program functions taking place in the master M are largely independent thereof. This allows the master M to allocate and receive information specifically to/from a separate LIN data line, for example the data line 3.

The invention claimed is:

1. A method for connecting a LIN master to LIN slaves in a LIN bus system that is used to transmit LIN information between the LIN master and the LIN slaves, wherein the LIN slaves include a plurality of identical LIN slaves, the method comprising the steps of:
    providing separate data lines for the plurality of identical LIN slaves, so that each of the separate data lines connects a respective one of the plurality of identical LIN slaves to the LIN master; and
    transmitting LIN information between the LIN master and the identical LIN slaves via the separate data lines that run between each of the identical LIN slaves and the LIN master, wherein each of the identical LIN slaves is associated with only a single respective device to be controlled, whereby no measures for identifying received control information in the identical LIN slaves are required.

2. The method according to claim 1, wherein the LIN master establishes LIN information that is required to be transmitted to respective ones of the identical LIN slaves via an associated one of the separate data lines.

3. The method according to claim 1, further comprising the steps of connecting at least one non-identical LIN slave to one of the separate data lines associated with the plurality of identical LIN slaves, and transmitting LIN information for the at least one non-identical LIN slave using the one of the separate data lines.

4. A device for carrying out a method for data communication, the device comprising a serial LIN bus system having a LIN master and a plurality of LIN slaves, at least two of the LIN slaves are identical LIN slaves, and separate data lines connecting the identical LIN slaves to the LIN master, so that each of the separate data lines connects a respective one of the identical LIN slaves to the LIN master, wherein each of the identical LIN slaves is associated with only a single respective device to be controlled, whereby no measures for identifying received control information in the identical LIN slaves are required.

5. A vehicle having the device according to claim 4.

6. The device according to claim 4, further comprising a general LIN data bus and a plurality of non-identical LIN slaves connected in series to the LIN master by the general LIN data bus.

7. The device according to claim 6, further comprising a further non-identical LIN slave connected to the LIN master by one of the separate data lines.

8. The device according to claim 1, further comprising the steps of providing a general LIN data bus and a plurality of non-identical LIN slaves connected in series to the LIN master by the general LIN data bus.

* * * * *